US 11,766,855 B2

(12) United States Patent
Lanksweirt et al.

(10) Patent No.: US 11,766,855 B2
(45) Date of Patent: Sep. 26, 2023

(54) METHOD FOR CONNECTING LAMINATION PARTS

(71) Applicant: voestalpine Automotive Components Dettingen GmbH & Co. KG, Dettingen an der Erms (DE)

(72) Inventors: Jochen Lanksweirt, Heidenheim (DE); Axel Nann, Waiblingen (DE)

(73) Assignee: voestalpine Automotive Components Dettingen GmbH & Co. KG, Dettingen an der Erms (DE)

(*) Notice: Subject to any disclaimer, the term of this patent is extended or adjusted under 35 U.S.C. 154(b) by 0 days.

(21) Appl. No.: 16/963,218

(22) PCT Filed: Jan. 18, 2019

(86) PCT No.: PCT/EP2019/051291
§ 371 (c)(1),
(2) Date: Jul. 18, 2020

(87) PCT Pub. No.: WO2019/141825
PCT Pub. Date: Jul. 25, 2019

(65) Prior Publication Data
US 2021/0060917 A1 Mar. 4, 2021

(30) Foreign Application Priority Data
Jan. 18, 2018 (EP) ..................... 18152368

(51) Int. Cl.
B32B 37/02 (2006.01)
B32B 3/30 (2006.01)
(Continued)

(52) U.S. Cl.
CPC ............. *B32B 37/02* (2013.01); *B32B 3/30* (2013.01); *B32B 7/12* (2013.01); *B32B 37/1207* (2013.01);
(Continued)

(58) Field of Classification Search
CPC .. B32B 37/02; B32B 3/30; B32B 7/12; B32B 37/1207; B32B 38/0004; B32B 38/06;
(Continued)

(56) References Cited

U.S. PATENT DOCUMENTS 4,578,853 A * 4/1986 Wurth ................. B21D 28/22
29/598
5,075,150 A * 12/1991 Webb ................ H01F 41/0233
428/162
(Continued)

FOREIGN PATENT DOCUMENTS

JP S52137610 A 11/1977
JP S54149820 A 11/1979
(Continued)

Primary Examiner — Christopher W Raimund

(57) ABSTRACT

A method for connecting lamination parts to form lamination stacks. In order to ensure a versatile applicability of the lamination stacks, it is proposed that first cut-outs are stamped out identically in the first sub-region and in a second sub-region of the electric strip, additional second cut-outs are stamped into the second sub-region in accordance with the number of spacers, which second cut-outs are embodied to accommodate the spacers, and a second lamination part stamped out from the second sub-region is stacked either before or after the first lamination part in such a way that when spacers of the first lamination part are resting against this second lamination part, the second cut-outs are positioned offset from these spacers.

19 Claims, 3 Drawing Sheets

(51) Int. Cl.
*B32B 7/12* (2006.01)
*B32B 37/12* (2006.01)
*B32B 38/00* (2006.01)
*B32B 38/06* (2006.01)
*B32B 38/18* (2006.01)
*H01F 41/02* (2006.01)

(52) U.S. Cl.
CPC .......... *B32B 38/0004* (2013.01); *B32B 38/06* (2013.01); *B32B 38/1816* (2013.01); *H01F 41/0233* (2013.01); *B32B 2037/1215* (2013.01)

(58) Field of Classification Search
CPC ........ B32B 38/1816; B32B 2037/1215; B32B 15/011; B32B 37/12; H01F 41/0233; H01F 41/024; H02K 15/02; C21D 8/12
See application file for complete search history.

(56) References Cited

U.S. PATENT DOCUMENTS

| | | | |
|---|---|---|---|
| 2005/0152063 A1* | 7/2005 | Hara | H01Q 7/08 |
| | | | 29/603.01 |
| 2015/0256036 A1* | 9/2015 | Nakamura | H01F 41/024 |
| | | | 310/216.048 |
| 2017/0237320 A1 | 8/2017 | Urabe | |
| 2017/0250581 A1* | 8/2017 | Bauer | H02K 1/28 |
| 2018/0265757 A1* | 9/2018 | Thiede | B32B 7/12 |
| 2019/0109521 A1* | 4/2019 | Chung | H01F 41/0233 |

FOREIGN PATENT DOCUMENTS

| | | | | |
|---|---|---|---|---|
| JP | 57128906 A | * | 8/1982 | ............... H01F 3/02 |
| JP | S57128906 A | | 8/1982 | |
| JP | S59181945 A | | 10/1984 | |
| JP | 59220904 A | * | 12/1984 | ......... H01F 41/0233 |
| JP | 2004248423 A | | 9/2004 | |
| WO | 2016035959 A1 | | 3/2016 | |
| WO | 2017159926 A1 | | 9/2017 | |

* cited by examiner

METHOD FOR CONNECTING LAMINATION PARTS

FIELD OF THE INVENTION

The invention relates to a method for connecting lamination parts.

DESCRIPTION OF THE PRIOR ART

In order to be able to detach or divide lamination stacks that exit a stacking unit of a progressive stamping die from one another, it is known from the prior art (WO 2017/159926 A1) to provide a plurality of protruding spacers on a flat side of a lamination part at the end of each lamination stack. Before the lamination part on the end, which has a plurality of stamped cut-outs, is stamped out, these spacers are produced in a first sub-region by means of embossing. Such protruding spacers reduce the contact area between the lamination parts and lamination stacks in the stacking unit which reduces the strength of the integral bond or adhesive bond between the lamination stacks after the activation of the adhesive. Spacers according to this prior art do in fact make it easier to detach or divide lamination stacks from one another, but they reduce the potential applicability of the lamination stacks among other things because such spacers reduce the percentage of magnetically conductive material in the component. This is particularly relevant when multiple such lamination stacks are combined into one component.

For this reason, WO 2016/0035959 A1 proposes providing adhesive only in those sub-regions of the electrical strip, which after being divided from it also belong to lamination parts of the respective lamination stack. A provision of adhesive between lamination parts of different lamination stacks is omitted which prevents the lamination stacks from getting stuck in the stacking unit. Achieving reproducibility of the method disadvantageously requires a comparatively expensive control/regulation—for example in order to avoid impairing the function of the progressive stamping die due to adhesive coming loose from the electric strip.

SUMMARY OF THE INVENTION

The object of the invention, therefore, is to provide a method for connecting lamination parts to form a lamination stack, which method features simple implementation, but does not limit the potential applicability of the lamination stacks produced therewith.

If first cut-outs are identically stamped into the first sub-region and a second sub-region of the electric strip and if additional second cut-outs are stamped into the second sub-region in accordance with the number or spacers, which second cut-outs are embodied to accommodate the spacers, then lamination stacks can be prepared for a possibly desired receiving of spacers of other lamination stacks. The lamination stacks according to the invention specifically each have either spacers or second cut-outs at opposite ends. In this way, it is possible to achieve the fact that when combining multiple lamination stacks into one component, the spacers do not necessarily space them apart from one another—which does not require acceptance of a limitation of the potential applicability of such lamination stacks with spacers on the end. Preferably, the spacers are identically embodied in order to achieve this. This can further facilitate the implementation of the method.

In order for the spacers on the first lamination part—despite the presence of the cut-outs in the second lamination part—to be able to still facilitate a detachment of stacked and glued lamination parts into lamination stacks, a second lamination part that is stamped out from the second sub-region is stacked either before or after the first lamination part in such a way that when spacers of the first lamination part are resting against this second lamination part, the second cut-outs are offset relative to these spacers. It is thus possible, for example, to prevent the first lamination part from sticking to the second lamination part over its entire area and this therefore produces a weakened bond between these lamination stacks. The lamination stacks themselves are thus tightly packed and their lamination parts are bonded to each other over a large area, i.e. in a particularly durable fashion.

The method according to the invention can therefore also have a high reproducibility in addition to the comparatively versatile potential applicability of the produced lamination stacks.

The control/regulation expense in the method can be further reduced if the second sub-region is positioned immediately before or after the first sub-region on the electric strip. It is thus possible, for example, to dispense with special measures for synchronizing the stamping die, for example a progressive stamping die, which can further increase the reproducibility of the method.

Preferably, the second cut-outs are embodied as complementary to the spacers, thus reducing the method complexity required for the insertion, particularly because this allows the same unit to be used to produce the cut-outs and spacers.

If when the first and second lamination parts are stacked, the second cut-outs have an angular offset relative to the spacers, then this can reliably prevent the spacers from traveling into the cut-outs when the lamination parts are stacked. This makes it possible to further increase the reproducibility of the method.

The operation of the method can be facilitated—while retaining the above advantages—if the stacked lamination parts are rotated in order to produce the angular offset. In addition, this rotation can achieve a design simplification of the device because for example the spacers and the cut-outs can be produced by the same device. As a result, the device for the cut-outs can be pushed deeper into the electric strip—In comparison to the production of the spacers. In addition, the use of only one device for producing the spacers and the cut-outs can further increase the reliability of the method and the reproducibility thereof.

Depending on the given height of the spacers, the method can be functionally expanded if the electric strip is provided with a number of successive second sub-regions such that when the lamination parts are stacked, the second cut-outs are embodied to entirely accommodate the spacers of the first lamination part.

For example, in order to achieve a complete accommodation of the spacers of one lamination stack in the cut-outs of another lamination stack, it can be sufficient if at most three successive second sub-regions are provided on the electric strip.

If in terms of their width, the spacers are embossed to at least the coating thickness (hk) of the adhesive layer, then the impairment of the lamination stack with regard to magnetic parameters can remain slight. In terms of their width, the spacers are preferably embossed to at least the sheet thickness of the electrical strip in order to produce a mechanically resilient dividing element and in order to space the stacked lamination stacks apart in a durable fashion. This can further improve the reproducibility of the method.

If the width of the spacers is at least 1 mm, then this can achieve sufficient mechanical resilience of the dividing element. This is particularly true if the width of the spacers is at least 1.5 mm.

It can also be sufficient if the width of the spacers is at most five times the sheet thickness of the electrical strip.

The detachment of the lamination stacks from each other can be carried out in a reproducible way if in terms of their height, the spacers are embossed to at least the coating thickness of the adhesive layer. It is thus possible, for example, to ensure a sufficient distance between the adhesive coating and a lamination part on one end.

If the height of the spacers is at least twice the coating thickness of the adhesive layer, then this can further facilitate the division of the lamination stacks. This can be achieved even if the electric strip is coated with an adhesive layer on both sides.

Preferably, the height of the spacers is at most three times the sheet thickness of the electrical strip in order to thus be able to ensure a sufficient spacing with a high stacking density. It can be sufficient if the height of the spacers corresponds to the sheet thickness of the electrical strip.

If the lateral spacing between two successive spacers corresponds to at least the smallest width of these spacers, then this can promote the mechanical rigidity of the dividing element and further increase its stability. This further improves the reproducibility of the method.

The detachment or division of the lamination stacks can be further facilitated if the cross-section of the spacer has a trapezoidal, semicircular, or rectangular contour. A semicircular contour can be particularly advantageous in this connection—for example in order to also reliably avoid damage to adjacent lamination stacks. This makes it possible to further increase the reproducibility of the method.

If the stacked lamination parts are glued to form a plurality of lamination stacks through activation of the adhesive layer, then this can lead to a particularly resilient integral bond between the lamination parts and thus to durable lamination stacks—which lamination stacks can nevertheless be reproducibly detached from one another with the aid of the dividing element. An in particular thermal activation of the adhesive layer is comparatively easy to implement. It is also conceivable to activate the adhesive layer chemically by means of an activator, accelerator, etc.

If head sections of the spacers are detached before the first lamination part is stamped out, it is possible to achieve a reducing influence on the adhesion tendency of the spacers—making it possible to further facilitate the division into lamination stacks.

BRIEF DESCRIPTION OF THE DRAWINGS

The subject of the invention is shown by way of example in the drawings based on several embodiment variants. In the drawings.

WAY TO EMBODY THE INVENTION

Figure 1:
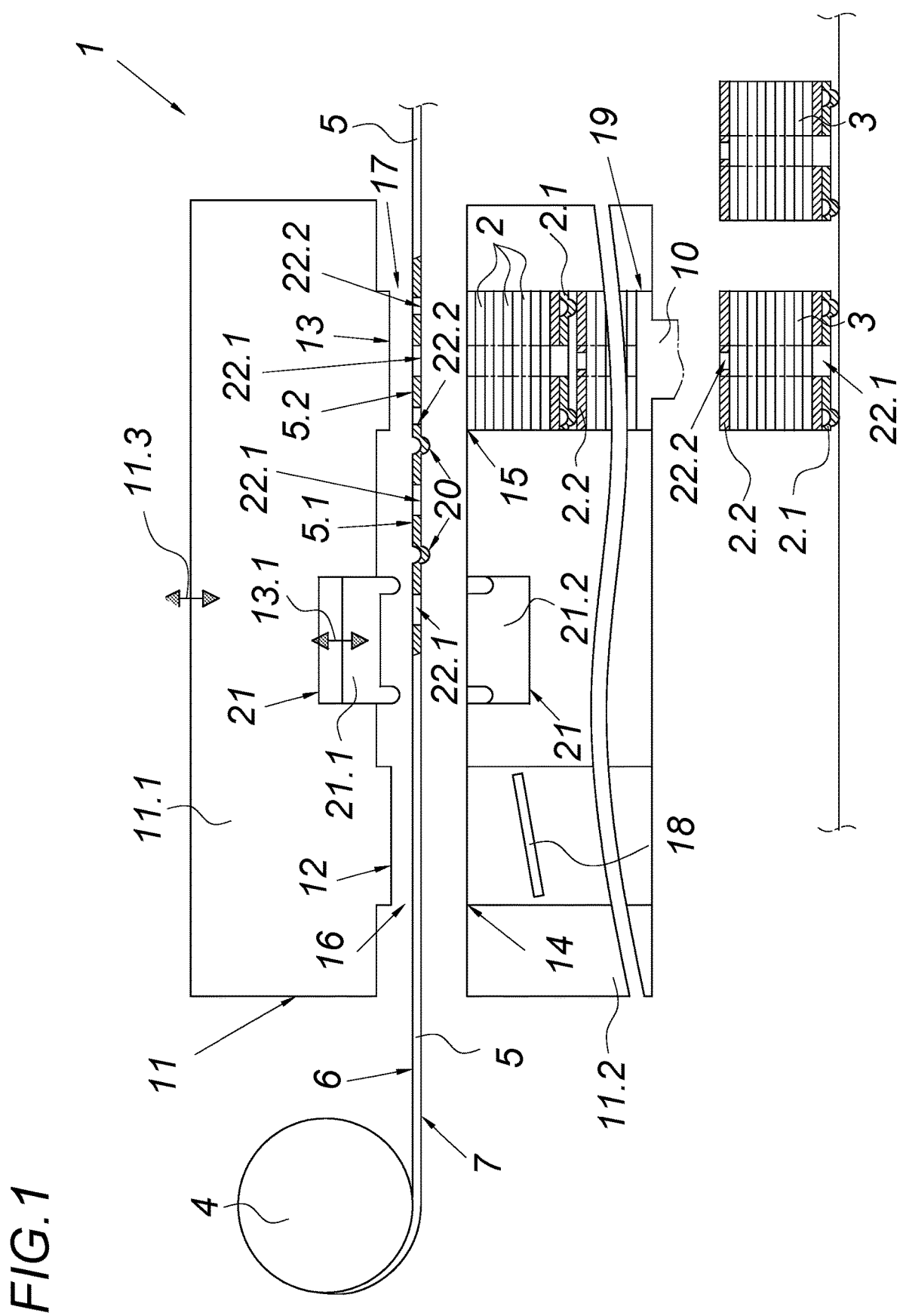
FIG. 1 shows a schematic view of a device for producing lamination stacks.
Figure 2:
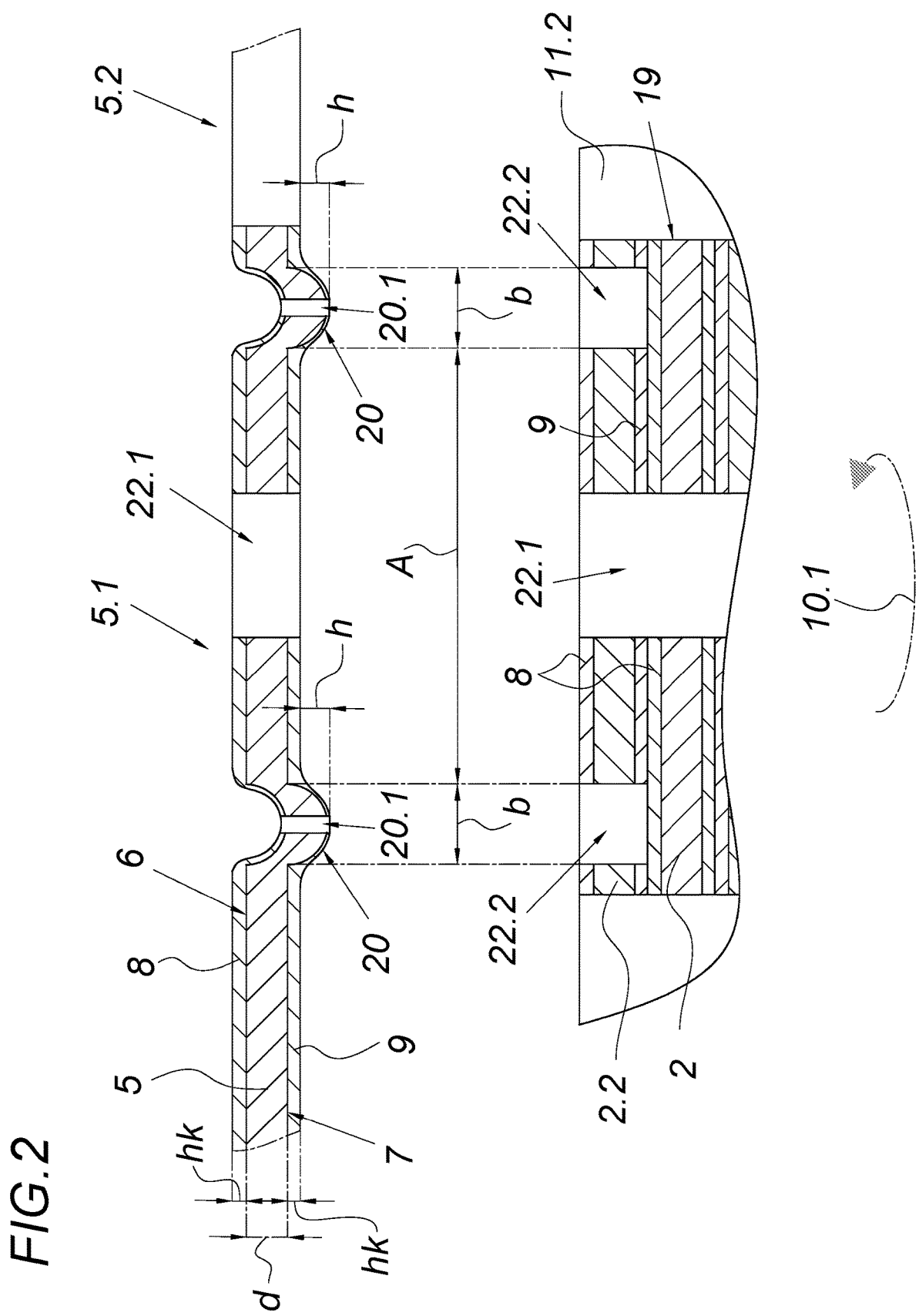
FIG. 2 shows an enlarged partial view of the last stamping step according to FIG. 1 before a first lamination part is stamped out, according to a first embodiment variant.

A device 1 for carrying out the method according to the invention is schematically depicted in the exemplary embodiment shown in FIG. 1. This device 1 is used for bundling stamped-out lamination parts 2, 2.1, 2.2 to form lamination stacks 3, 30. For this purpose, an electric strip 5 is unwound from a coil 4, which strip has an adhesive layer 8, 9, namely thermosetting hot-melt adhesive layers, covering the entire area of one or both of its flat sides 6, 7—which adhesive layers 8, 9 are shown in FIG. 2.

A stamping die 11 is used to stamp out multiple lamination parts 2, 2.1, 2.2 from the electric strip 5, which is coated with adhesive on both sides. Such a stamping-out—generally speaking—can be a cutting-out, cutting-off, decoupling, clipping, breaking-apart by crushing, etc.

As is also apparent from FIG. 1, the stamping die 11—for example a progressive stamping die in this case—performs a cutting with several strokes 11.3, its upper die 11.1 cooperating with its lower die 11.2. With a first cutting edge 12 of the upper die 11.1, the electric strip 5 is pre-processed for a stamping-out procedure, after which a second cutting edge 13 of the upper die 11.1 stamps out and thus separates the lamination part 2 from the electric strip 5. Such a stamping-out procedure—to mention an example—can be a cutting-out, cutting-off, decoupling, clipping, breaking-apart by crushing, etc.

The cutting edges 12, 13 cooperate with the respective matrixes 14, 15 of the lower die 11.2 and thus constitute two stamping stages 16, 17 in the stamping die 10.

Such a progressive stamping can be seen in FIG. 1 in the fact that in the pre-processing, a part 18 is detached from the electric strip 5 in order to prepare the electric strip 5 for the stamping-out of the lamination parts 2, 2.1, 2.2. By means of the stamped-out part 18, cut-outs, namely first cut-outs 22.1, are produced for all of the lamination parts 2, 2.1, 2.2 in the electric strip 5. These first cut-outs 22.1, which are subsequently present in each lamination stack 3, are used for example as magnet pockets or for accommodating a shaft axis, etc. or are produced in order to increase a magnetic resistance in the lamination stack.

After this, the lamination parts 2, 2.1, 2.2 are stamped out with the aid of the stamping stage 17 and through pressure from the upper die 11.1, are pushed into a stacking unit 19 and stacked therein. For this purpose, the stacking unit 19 has a guide in the lower die 11.2. A counter holder 10, not shown in detail, is also provided in the guide. The counter holder 10 exerts a holding force on the lamination parts 2, which causes the lamination parts 2 to undergo a physical bonding through the pressure from the upper die 11.1 and with the aid of the adhesive layer 8, 9 provided between the lamination parts 2. The stacking unit 19 can be actively heated in order to activate the adhesive and to produce an adhesive bond or integral bond between the lamination parts 2—which is not shown in greater detail.

In order to be able to more easily divide the lamination stacks 3 from one another after they exit the stacking unit 19, the electric strip 5 on the first flat side 7 is prepared in a first sub-region 5.1 by the embossing of multiple protruding, identically embodied spacers 20—namely before the lamination parts 2 are stamped out. As a result, after the first lamination part 2.1 of the lamination parts 2 is stamped out from this first sub-region 5.1, a detachment of the stacked and glued lamination parts 2, 2.1, 2.2 into lamination stacks 3 is possible—as can be seen, for example, in FIG. 2. The presence of the spacers 20 specifically reduces the contact area of the adhesive layers 8, 9, thus significantly facilitating the detachment or division of the lamination stacks 3 after they exit the stacking unit 19.

This preparation of the first sub-region 5.1 is carried out by means of a device 21 that has a die 21.1 and a cooperating die-plate 21.2 and is used to emboss the electric strip 5. The die 21.1 can be moved back and forth in the upper die 11.1 along a linear guide 13.1 and can thus be used as needed for preparing the electric strip 5.

According to the invention, this device 21 also prepares the electric strip 5 in a second sub-region 5.2 and specifically in the exemplary embodiment, immediately before the first sub-region 5.1—see FIG. 1 in this regard. To do so, the die 21.1 merely penetrates deeper into the electric strip 5. In this second sub-region 5.2, second cut-outs 22.2 are stamped in accordance with the number of spacers 20 of the first sub-region 5.1 for the first cut-outs 22.1. These cut-outs 22.2 are in addition to the first cut-outs 22.1, which are identically stamped into the first and second sub-regions 5.1, 5.2 of the electric strip 5. In the exemplary embodiment, these first cut-outs 22.1 are identically present in all of the stamped-out lamination parts 2, 2.1, 2.2.

These second cut-outs 22.2 are embodied to accommodate the spacers 20. Consequently, the spacers 20 can align with play in the respective cut-outs 22.2, as can be clearly seen in the stacking unit 19 from the second lamination part 2.2 that is stamped out from the second sub-region 5.2. Preferably, these second cut-outs 22.2 are embodied as complementary to the spacers 20.

The spacers 20 and second cut-outs 22.2, however, do not impair the detachment of the lamination parts 2, 2.1, 2.2, which are stacked and glued to one another, into lamination stacks 3. Specifically, the counter holder 10 moves in the rotation direction 10.1 and rotates the stacked lamination parts 2, 2.1, 2.2 before a respective first lamination part 2.1 is placed onto a second lamination part 2.2 that is already present in the stacking unit 19. This ensures that the second cut-outs 22.2 of the second lamination part 2.2 are positioned with an angular offset relative to the spacers 20 of the first lamination part 2.1 resting against the second lamination part 2.2.

The lamination stacks 3 do indeed each have a first lamination part 2.1 with protruding spacers 20 at one end 3.1, but at the opposite end 3.2, they have second cut-outs 22.2 in the second lamination part 2.2. As a result, these lamination parts can accommodate other lamination stacks 3—if so desired—and thus can prevent a space from occurring between lamination parts 2, 2.1, 2.2. The lamination stacks 3 according to the invention, despite the presence of the spacers 20, are thus suitable for all applications, i.e. can be used in an extremely variable way.

The spacers 20.1, 20.2 have a semicircular contour in cross-section and protrude in the form of a segment of a circle from the flat side 7 of the electrical strip 5 or more precisely, of the first lamination part 10. The shape of a segment of a circle proves to be of value among other things in preventing damage to the surface of the lamination parts 2, 2.2. Correspondingly, the complementary second cut-outs 22.2 are embodied as semicircular holes.

The spacers 20 have a width b and a height h—and these are produced by means of embossing. Based on this height h, it is possible, for example, to ensure a sufficient spacing between the adhesive coating and a lamination part 2 on the end. Based on the width b, it is possible to ensure a sufficient mechanical resilience of the spacers 20 when the lamination parts 2, 2.1, 2.2 are stacked. The distance A between adjacent spacers 20 corresponds to at least the minimum width b of these spacers 20.

For example, the electric strip 5 has a sheet thickness von 0.1 to 1 mm, namely 0.7 mm. The layer thickness hk of the adhesive layers 8, 9 is 2 to 4 µm. A division into lamination stacks 3 that is simple from a process standpoint is achieved if the spacers 20 have a width b of 1.5 mm and a height h of 0.7 mm.

Figure 3:
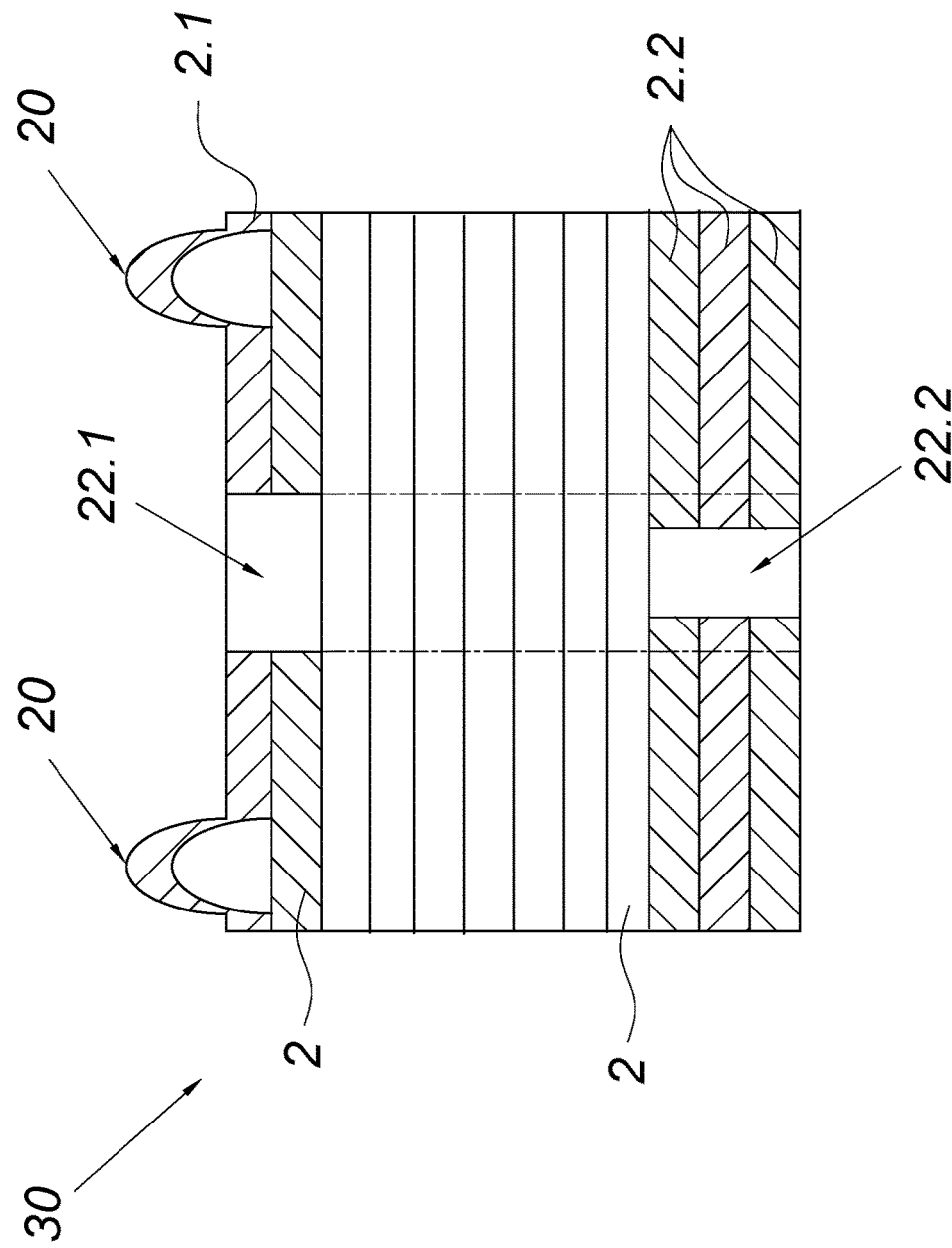
FIG. 3 shows a view of a lamination stack according to a second exemplary embodiment, produced by means of the method according to the invention.

FIG. 3 shows another lamination stack 30 according to another exemplary embodiment.

In this case, the height h of the spacers 20 corresponds to approximately twice the sheet thickness d. Correspondingly, the electric strip 5 is provided with three second sub-regions 5.2 with second recesses 22.2 in order to produce adjoining cut-outs 22.2 in the lamination stack 30, which cut-outs are embodied to entirely accommodate the spacers 22 of the first lamination part 2.1.

In the electric strip 4, therefore, a successive number of second sub-regions 5.2 is provided in such a way that when the lamination parts 2, 2.1, 2.2 are stacked, the second cut-outs 22.2 are embodied to entirely accommodate the spacers 22 of the first lamination part 2.1.

FIG. 2 also shows that before the first lamination part 2.1 is stamped out, all of the spacers 20 have a detached head section 20.1. For example, this is performed by perforation of the electrical strip 5 before, during, or after the embossing of the spacers 20. Preferably, the spacer 20 is perforated in order to detach its head section 20.1.

The activatable adhesive layer 8, 9 on the relevant spacers 20—which is detached in a simple way from a process standpoint, for example—can thus be reduced the size, which further facilitates the division of the lamination stacks 3.

The invention claimed is:

1. A method for connecting lamination parts to form lamination stacks, comprising:
    providing an electrical strip that is coated with an activatable adhesive layer on both flat sides of the electrical strip;
    embossing the electrical strip in a first sub-region, which produces a plurality of protruding spacers on one of the flat sides of the electrical strip;
    stamping a plurality of cut-outs into the electrical strip, including identically stamping out a plurality of first cut-outs in the first sub-region and in a second sub-region of the electrical strip, and additionally stamping out a plurality of second cut-outs in the second sub-region corresponding to the number of spacers, which second cut-outs are embodied to accommodate the spacers;
    stamping out at least one first lamination part from the first sub-region of the electrical strip and stamping out at least one second lamination part from the second sub-region of the electrical strip, and
    stacking and gluing the stamped-out first and second lamination parts to form a plurality of lamination stacks through activation of the adhesive layer, wherein the stacking includes stacking the second lamination part either before or after stacking the first lamination part, such that when the spacers of the first lamination part are resting against the second lamination part, the second cut-outs are positioned offset from the spacers and the second lamination part is spaced apart from the first lamination part by the spacers, the purpose of which spacing is to facilitate detachment of the stacked and glued lamination parts into the lamination stacks.

2. The method according to claim 1, wherein the second sub-region is positioned immediately before or after the first sub-region of the electrical strip.

3. The method according to claim 1, wherein the second cut-outs are complementary to the spacers.

4. The method according to claim 1, wherein when the first and second lamination parts are stacked, the second cut-outs have an angular offset relative to the spacers.

5. The method according to claim 4, wherein the stacked lamination parts are rotated in order to produce the angular offset.

6. The method according to claim 1, wherein the electrical strip is provided with a plurality of successive second sub-regions such that when the first and second lamination parts are stacked, the second cut-outs entirely accommodate the spacers of the first lamination part.

7. The method according to claim 6, wherein at most, three successive second sub-regions are provided on the electrical strip.

8. The method according to claim 1, wherein in terms of width, the spacers are embossed to at least a coating thickness of the adhesive layer.

9. The method according to claim 8, wherein the width of the spacers is at least 1 mm.

10. The method according to claim 8, wherein the width of the spacers is at most five times a sheet thickness of the electrical strip.

11. The method according to claim 1, wherein in terms of height, the spacers are embossed to at least a coating thickness of the adhesive layer.

12. The method according to claim 11, wherein the height of the spacers is at most three times a sheet thickness of the electrical strip.

13. The method according to claim 1, wherein a lateral spacing between two successive spacers corresponds to at least a smallest width of the spacers.

14. The method according to claim 1, wherein a cross-section of each of the plurality of spacers has a trapezoidal, semicircular, or rectangular contour.

15. The method according to claim 1, wherein head sections of the spacers are detached before the first lamination part is stamped out.

16. The method according to claim 1, wherein the activatable adhesive layer is a hot-melt adhesive layer.

17. The method according to claim 8, wherein the spacers are embossed to at least a sheet thickness of the electrical strip.

18. The method according to claim 12, wherein the height of the spacers is at most equivalent to the sheet thickness of the electrical strip.

19. The method according to claim 1, wherein the activation is thermal activation.

* * * * *